US010693680B2

(12) United States Patent
Sauerwein, Jr.

(10) Patent No.: US 10,693,680 B2
(45) Date of Patent: Jun. 23, 2020

(54) METHODS AND APPARATUSES FOR ENABLING SECURE COMMUNICATION BETWEEN MOBILE DEVICES AND A NETWORK

(71) Applicant: HAND HELD PRODUCTS, INC., Fort Mill, SC (US)

(72) Inventor: James Timothy Sauerwein, Jr., Charlotte, NC (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 15/976,093

(22) Filed: May 10, 2018

(65) Prior Publication Data
US 2018/0337803 A1 Nov. 22, 2018

Related U.S. Application Data

(60) Provisional application No. 62/507,455, filed on May 17, 2017.

(51) Int. Cl.
*H04L 12/66* (2006.01)
*H04L 12/26* (2006.01)
(Continued)

(52) U.S. Cl.
CPC ............ *H04L 12/66* (2013.01); *H04L 9/32* (2013.01); *H04L 41/12* (2013.01); *H04L 43/04* (2013.01);
(Continued)

(58) Field of Classification Search
None
See application file for complete search history.

(56) References Cited

U.S. PATENT DOCUMENTS 8,316,237 B1 * 11/2012 Felsher ................. H04L 9/0825
380/282
9,172,605 B2 10/2015 Hardy et al.
(Continued)

OTHER PUBLICATIONS

Gascon, D., IoT Security Inforgraphic—Privacy, Authenticity, Confidentiality and Integrity of the Sensor Data, "The Invisible Asset" | Libelium [online] [retrieved Jan. 12, 2017]. Retrieved from the Internet: <URL:http://www.libelium.com/iot-infographic-privacy-authenticity-confidentiality-and-integrity-of-the-sensor-data-the-invisible-asset/>, (dated Dec. 15, 2015) 4 pages.

*Primary Examiner* — Xavier S Wong
(74) *Attorney, Agent, or Firm* — Alston & Bird LLP

(57) ABSTRACT

Example methods, apparatuses and systems are disclosed for establishing a secure communication channel between a network establishment service and a monitoring node. An example method includes retrieving, by a processor of a network establishment service, a monitoring node identifier (MID) corresponding to a monitoring node associated with a particular monitoring platform, wherein the MID comprises a private token unique to the monitoring node. The example method further includes identifying, by node configuration circuitry of the network establishment service and based on information regarding the monitoring node, a preferred gateway node for communicating with the monitoring node. The example method further includes logically pairing, by the node configuration circuitry of the network establishment service, the monitoring node with the preferred gateway node, and transmitting, by communications circuitry of the network establishment service, the association information to the preferred gateway node. Corresponding apparatuses, systems, and computer program products are also provided.

20 Claims, 8 Drawing Sheets

(51) Int. Cl.
*H04L 12/24* (2006.01)
*H04L 9/32* (2006.01)
*H04L 29/06* (2006.01)
H04W 36/00 (2009.01)
H04L 29/08 (2006.01)
H04W 4/70 (2018.01)
H04W 4/38 (2018.01)
H04W 36/12 (2009.01)

(52) U.S. Cl.
CPC ...... *H04L 63/0428* (2013.01); *H04L 41/0816* (2013.01); *H04L 43/0811* (2013.01); *H04L 67/12* (2013.01); *H04L 67/22* (2013.01); *H04W 4/38* (2018.02); *H04W 4/70* (2018.02); *H04W 36/0005* (2013.01); *H04W 36/12* (2013.01)

(56) References Cited

U.S. PATENT DOCUMENTS

| | | | |
|---|---|---|---|
| 9,451,462 | B2 | 9/2016 | Kim et al. |
| 9,477,936 | B2 | 10/2016 | Lawson et al. |
| 2014/0029411 | A1* | 1/2014 | Nayak ................. H04L 41/0654 370/219 |
| 2015/0237154 | A1* | 8/2015 | Wang ................... H04L 67/025 709/217 |
| 2016/0044032 | A1* | 2/2016 | Kim .................... H04L 63/0876 726/5 |
| 2016/0205078 | A1* | 7/2016 | James ................ H04L 63/0442 713/171 |
| 2017/0202037 | A1* | 7/2017 | Hong .................... H04W 12/06 |
| 2017/0303119 | A1* | 10/2017 | Ogura ................ G06F 19/3418 |
| 2018/0227720 | A1* | 8/2018 | Ziller ..................... H04L 67/26 |

\* cited by examiner

METHODS AND APPARATUSES FOR ENABLING SECURE COMMUNICATION BETWEEN MOBILE DEVICES AND A NETWORK

CROSS-REFERENCE TO RELATED APPLICATIONS

This applications claims the benefit of U.S. Provisional Patent Application No. 62/507,455, filed May 17, 2017, the entire contents of which are incorporated by reference herein.

TECHNOLOGICAL FIELD

Example embodiments of the present invention relate generally to mobile sensing devices and, more particularly, to methods and apparatuses that generate secure communication channels between mobile sensing devices and a cloud network via one or more preferred gateway.

BACKGROUND

For many Internet of Things (IOT) deployments, mobile sensing/monitoring platforms are in communication with a backend cloud network that performs analytics on data received from the mobile sensing platform. Typically, the sensing/monitoring platforms communicate with web services or a cloud network via multiple mobile/network gateways disposed throughout a physical environment. Applicant has identified a number of deficiencies and problems associated with traditional modes by which such communication occurs. Through applied effort, ingenuity, and innovation, many of these identified problems have been solved by developing solutions that are included in embodiments of the present invention, many examples of which are described in detail herein.

SUMMARY

Traditional methods for establishing channels of communication between cloud service and a target mobile sensing platform are cumbersome, time-consuming, error-prone, and often require manual intervention. Further, the established communication channel between the mobile sensing platforms and the cloud service is unsecured and thus prone to various network attacks, such as Trojan horse, man-in-the-middle, and denial-of-service (DOS) attacks, Internet protocol (IP) spoofing, sniffer attacks, black-hole attacks, and the like.

Example embodiments described herein illustrate techniques for establishing secured communications between a network establishment service (e.g., cloud based services, cloud based platforms, or the like) and multiple monitoring nodes (e.g., mobile sensing platforms including sensors, beacons, RFID tags and other monitoring devices) in a networked environment. The secured communication channel created between monitoring nodes and the network establishment service secures the exchange of data, so that confidentiality, integrity, and availability of the data captured or monitored by the monitoring nodes is not comprised during a data exchange. According to various embodiments described herein, the network establishment service performs logical pairing of various monitoring nodes to one or more preferred gateway nodes based on unique identifiers associated with the monitoring nodes. Association information regarding the logical pairing can be utilized to generate encrypted messages from the preferred gateway nodes to the monitoring nodes. The monitoring nodes may decipher and validate appropriately encrypted messages, and accordingly a secured communication channel is established between the monitoring nodes and the network establishment service.

According to some example embodiments described herein, a procedure for establishing a secure communication channel between a monitoring node and a network establishment service begins with the network establishment service retrieving a monitoring node identifier associated with a monitoring node. Typically, a sensing platform environment may comprise multiple monitoring nodes, where each of the monitoring node may be uniquely associated to a monitoring node identifier that uniquely identifies that node within the sensing platform. In an operation of the exemplary embodiment, the network establishment service identifies a preferred gateway that may communicate with the monitoring node and logically pairs or associates the monitoring node with the preferred gateway based on the retrieved monitoring node identifier. Further, the network establishment service transmits the association information to the preferred gateway. The transmission of the association information facilitates generation of secured messages from the preferred gateway node to the monitoring node, where the secured messages are encrypted using the monitoring node identifiers. The generated encrypted messages upon transmission to the monitoring nodes and on subsequent validation at the monitoring nodes provides for establishing the secured communication channel.

According to some example embodiments described herein, the gateway node may receive association information pertaining to association of the monitoring node with gateway node. Further, upon receiving of the association information, the gateway node may generate a secure message encrypted using a monitoring node identifier of the monitoring node. Furthermore, the gateway node may transmit the secured message to the monitoring node for initiating secured communication between the monitoring node and the network establishment service.

According to some example embodiments described herein, each monitoring node, upon receipt of a secured message, can attempt to decipher the received message using a monitoring node identifier, and upon successful deciphering, performs an action based on the secured message. For instance, upon successful decryption, the monitoring nodes may initiate transmission of data monitored by the monitoring nodes via the preferred gateway to the network establishment service.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Figure 1:
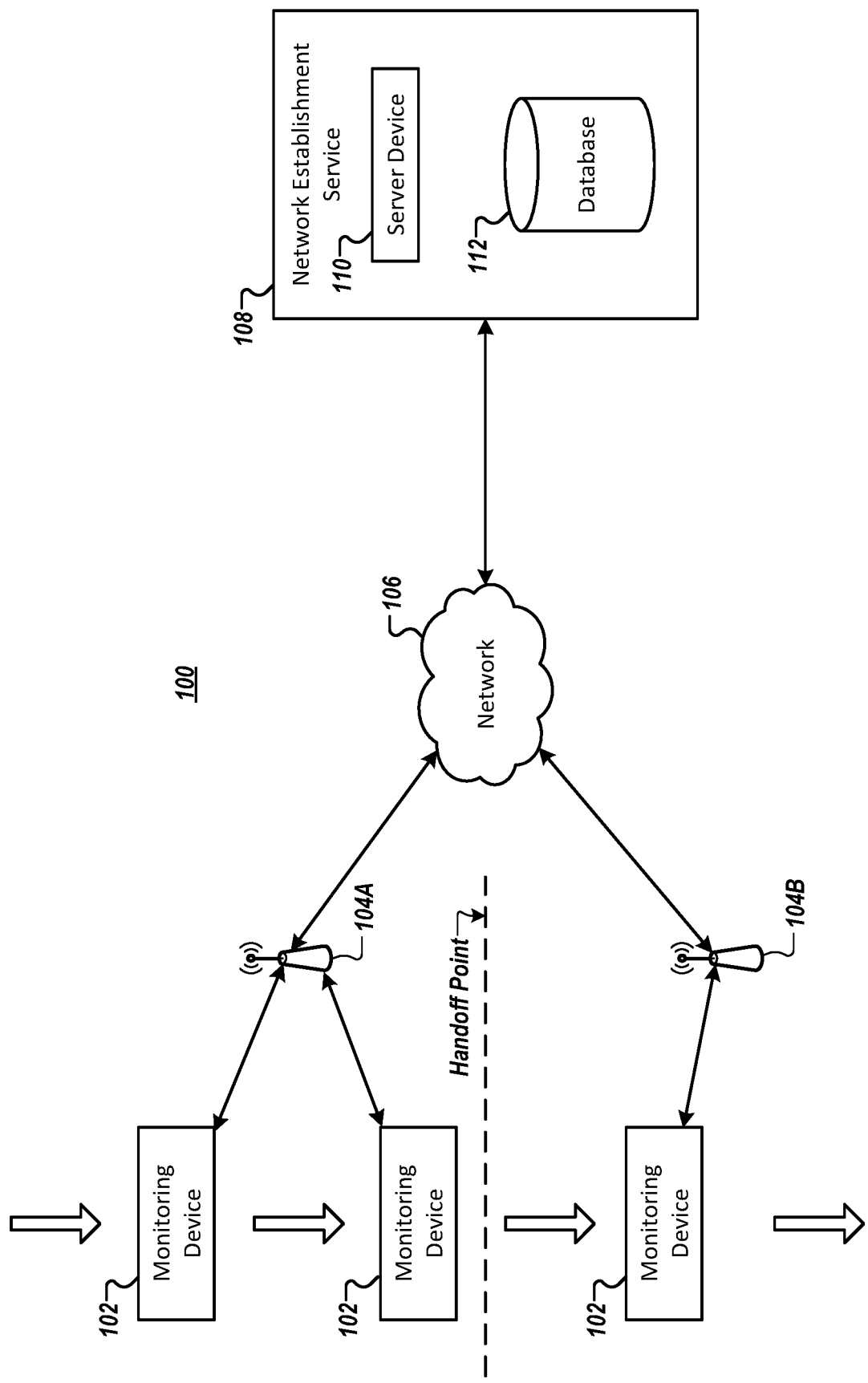
FIG. 1 illustrates a system diagram of one example implementation of some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

The word "exemplary," when used herein, is intended to mean "serving as an example, instance, or illustration." Any implementation described herein as "exemplary" is not necessarily preferred or advantageous over other implementations.

The terms "monitoring node" and "monitoring device" may be used interchangeably herein to refer to a wired or wireless device configured to transmit and/or receive information in some form. In this regard, a monitoring node may comprise an active or passive sensor that can gather information regarding its environment, (e.g., by measuring temperature, pressure, speed, direction, acceleration, orientation, or the like), a transmitter (e.g., any device facilitating transmission of information to a gateway node, such as an RFID tag, a beacon device, or the like), a receiver (e.g., any device facilitating receipt of information from a gateway node, such as a barcode scanner, an RFID reader, an image capturing device, an indicia reader, a smartphone, or the like) or some combination thereof. In some embodiments, a monitoring node may further include more than one of the aforementioned components. It is to be noted that the terms "monitoring nodes" and "monitoring devices" may be interchangeably used at multiple instances throughout the description and has same meaning.

The term "monitoring node identifier" (i.e., MID) refers to private token unique to a given monitoring node. Although a monitoring node may include a serial number, the serial numbers may often be publicly displayed on a housing of the monitoring node and in any event is often required for purposes other than secure communication (e.g., inventory management, part replacement, compatibility inquiries, or the like). In contrast, the MID comprises a private token stored by the monitoring node (and it may be stored by the monitoring node in encrypted form in some embodiments). The MID may be exchanged between the monitoring node and a network establishment service prior to deployment of the monitoring node, and may thereafter be used by the monitoring node to decipher communications encrypted using the MID. In some embodiments, the MID may also comprise a capability matrix defining capabilities of the corresponding monitoring node.

The term "monitoring platform" is used herein to refer to an association of one or more monitoring nodes that capture information regarding an environment. While there may only be one monitoring node in some monitoring platforms, other monitoring platforms may comprise many distinct monitoring nodes and thus may capture a wide variety of environmental information.

The term "gateway node" refers to an access point capable of communicating directly with one or more monitoring nodes and also capable of communicating (either directly or alternatively indirectly via a network such as the Internet) with a network establishment service. In this regard, a gateway node may, for instance, be any of a network router, a network switch, a proxy server, a network bridge or any other gateway device that facilitates communication amongst one or more computing nodes, such as a monitoring device, and various other computing resources, such as a network establishment service and/or like within a network. In some example embodiments, a gateway node may be configured to facilitate inter-network or intra-network communication amongst and between said computing resources and computing nodes.

The term "preferred gateway node" refers to a gateway node that has been logically paired by a network establishment service with a particular monitoring node.

The term "network establishment service" refers to a server system that manages deployment of one or more monitoring nodes throughout a physical environment. In this regard, a network establishment service may be: a distributed system where various operations are performed by distinct computing resources deployed across a network and/or a cloud based platform or service, such as any of a software based service (SaaS), infrastructure based service (IaaS) or platform based service (PaaS) and/or like.

Overview

Conventionally, in many IoT applications, mobile sensing/monitoring platforms are often in communication with a backend cloud network for performing analytics on data received from the mobile sensing platform. Nowadays, in many field of operations or IoT based networks, the mobile sensing or monitoring platforms may include multiple sensor nodes/devices, other monitoring devices or tracking equipment, such as beacons, barcodes, RFID tags, and/or like, deployed in an environment and these monitoring nodes may be utilized for a variety of purposes within the environment. For instance, in a retail-store outlet or in an inventory, there may be many commodities on which coded information like barcodes, QR codes, or RFID tags are affixed for tracking details and movement of the commodity throughout a cycle of a commodity transaction. In some other situations, beacons are affixed at multiple places within a logistic environment for monitoring and alerting the commodity movement from one place to another place during a logistic transaction. In another applications, multiple sensors are deployed in a working area for sensing data pertaining to performance and management of such commodities.

In such example applications, there may be a desire to send to a cloud based service or cloud platforms any data pertaining to the commodities, such as details of the commodity, its corresponding transactions, movement of the commodity or any other information associated with the commodity to be tracked. The cloud based service or the platform is utilized for accessing the data and performing analytics on the data to provide customized services over the IoT network. For example, a retailer may use a cloud based service that accesses data pertaining to commodities in an inventory store. The inventory store may have different types of commodities where details of each of such commodity is encoded in RFID tags or barcodes affixed to the commodities. Further, the inventory store may have other monitoring devices and sensors which sense the data to be utilized for inventory tracking. In such situations, the retailer may access, on the cloud based service, an enterprise resource planning (ERP) web application that utilizes the data retrieved from the monitoring platform to manage logistics, such as inventory at stores, delivery tracking of commodities, and/or may provide other customized services to distributors. In many such example scenarios, generally, these sensing/monitoring platforms communicate to web services or cloud network via multiple mobile/network gateways preferred for communication. However, in most of such situations, establishing communication of the cloud service with a target mobile sensing platform is cumbersome, time-consuming, and error-prone, and often requires manual intervention for handling and defining network parameters and preferred gateways. Further, the established communication between the mobile sensing platforms and the cloud service is not secured and is thus prone to malicious access and/or disruption, as mentioned previously, which ultimately compromises the data privacy, integrity, and availability of the entire system.

Example embodiments described herein provide methods, apparatuses, and systems for enabling secure communication between a monitoring platform comprising multiple monitoring devices and a network establishment service, such as a cloud based platform or service, a web server, a distributed system network and/or like. In accordance with an example implementation of the present subject matter, a secure communication channel can be established between multiple monitoring devices and the network establishment service via a gateway node over a network.

A networked environment 100 is illustrated in FIG. 1 that shows an example deployment of a monitoring device 102 from amongst the multiple monitoring devices 102 that may be deployed to a monitoring platform such as sensing platform in an IoT environment. The monitoring device 102 communicates with a network establishment service 108 via one or more gateway nodes 104A or 104B and over a network 106. It will be appreciated that while two gateway nodes 104A and 104B are depicted in FIG. 1 for ease of explanation, there may be any number of gateway nodes 104 with which the monitoring device 102 may communicate in a given environment. In some example scenarios, a monitoring platform as described previously, may comprise sensor devices, multiple RFID tags, indicia or coded information affixed on various commodities, and/or devices for reading and decoding data from such tags and indicia. If the commodities are in transit (e.g., in delivery to a destination), data corresponding to such monitoring devices may be transmitted to the network establishment service via a gateway 104 for processing and performing further data analytics. The transmission of the data may happen via a particular preferred gateway node 104 from amongst plurality of available gateway nodes 104 available in the network. Determining which gateway node 104 is preferred depends in this regard on the location of the monitoring device 102 and the location of the various gateway nodes 104. As shown in FIG. 1, the position of monitoring device 102 may move over time (as shown in FIG. 1 via downward arrows), and as the position or location of the monitoring device 102 changes, the selection of the preferred gateway node may change (as would occur, for instance, at the "Handoff Point" in the illustration in FIG. 1). Accordingly, the choice of preferred gateway node 104A or 104B for transferring the data from the monitoring devices 102 to the network establishment service 108 may change over time.

The network establishment service 108 as described previously may also comprise a server device 110 coupled to a database 112. Server device 110 may comprise any of one or more fixed devices as would be known in the art, and may be embodied by the component parts illustrated in FIG. 3, as described below. Database 112 may itself comprise one or more non-transitory storage media or may otherwise be hosted by a memory comprising such storage media. Moreover, database 112 may store data regarding various monitoring devices 102, such as the MID of a given monitoring device 102, a current location of the monitoring device 102, a currently preferred gateway device of the monitoring device 102, and the like. The information stored by database 112 may be updated on a periodic or ad hoc basis, and data regarding the set of monitoring devices 102 or the set of gateway devices 104 may be updated together in a batch process or may be updated separately via specific operations updating data regarding specific monitoring devices 102 or gateway devices 104. Database 112 may further store information regarding various gateway nodes 104 associated with the network establishment service 108. For instance, database 112 may store an identifier, (e.g., an IP address or MAC address) of the first gateway node 104A and a location of the first gateway node 104A (which may in some embodiments be static although in other embodiments it is conceivable that the gateway node 104A can be mobile). Moreover, database 112 may store geo-fence information identifying a region surrounding each gateway node 104 within which monitoring devices 102 should be logically paired with that gateway node 104.

As shown in the example illustrated in FIG. 1, when initially deploying monitoring device 102, a network establishment service 108 logically pairs the monitoring device 102 with gateway node 104A, which facilitates secure communication, via the network 106, between the monitoring device 102 and the network establishment service 108. To do this, the first gateway node 104A uses the monitoring device identifier (MID) associated with the monitoring device 102, as described in greater detail below, to generate secure messages for communicating with the monitoring node 102. As mentioned earlier, the physical location of the monitoring device 102 may change over time, but initially as the monitoring device 102 moves through physical space, it remains paired with the first gateway node 104A unless the network establishment service 108 requests a handoff. In regard to this, when the network establishment service 108 detects that the monitoring device 102 has reached a handoff point (e.g., by determining that its location falls within a geo-fence associated with gateway node 104B rather than with gateway node 104A), the network establishment service 108 may transmit an instruction to the first gateway node 104A to handoff the monitoring node 102 to the second gateway node 104B.

For instance, in reference to the example illustrated previously, where the multiple monitoring devices 102 may be RFID tags, or coded information identifiers, such as barcodes or QR codes affixed to the various commodities, a hand-off situation may occur in a logistics or transportation environment, when a pallet of goods to which the monitoring node is attached is removed from a ship or loaded onto a train or a truck and the location corresponding to the monitoring device 102 changes from a region, such as a cellular region associated with a first gateway node 104A to another associated with a second gateway node 104B. In such situations, the monitoring device 102 may be instructed to change into a "discovery" mode looking for the second gateway node 104B. Accordingly, the network establishment service 108 logically pairs the monitoring device 102 with the second preferred gateway node 104B. A sequence of operations amongst the monitoring devices 102, the gateway nodes 104A and 104B, and the network establishment service 108 over the communication network 106 are described in detail with hereinafter in reference to one example shown in FIG. 2.

Figure 2:
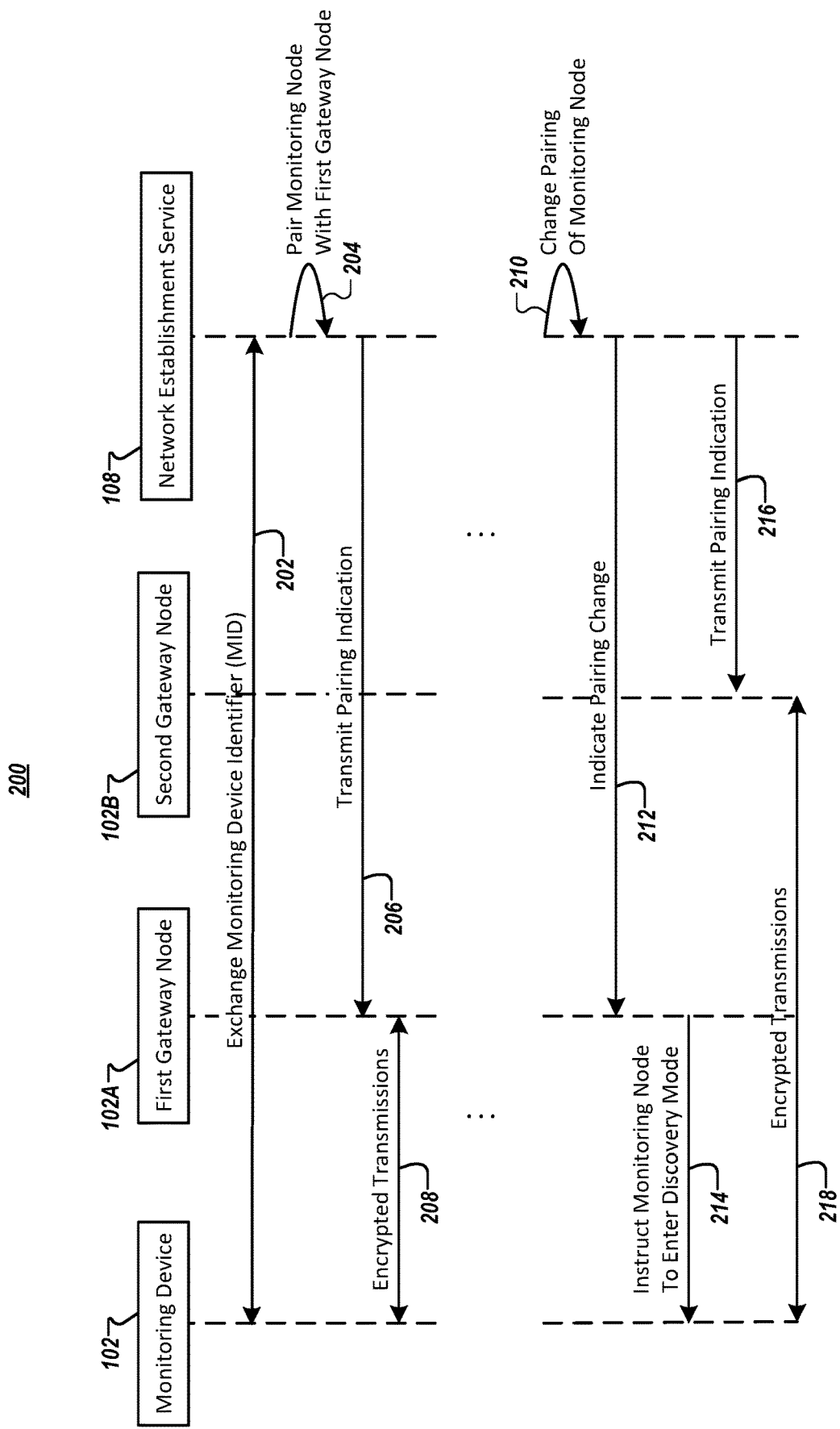
FIG. 2 illustrates a process flow illustrating a sequence of events occurring in one example embodiment described herein.

FIG. 2 illustrates an exemplary process flow 200 depicting a sequence of events occurring in one example embodiment described herein. At or before the time that a given monitoring node 102 is initially deployed in the networked environment 100, operation 202 illustrates that the monitoring device 102 and the network establishment service 108 will exchange messages, and during that exchange the monitoring device 102 will provide its monitoring device identifier (MID) to the network establishment service 108. For instance, in one example implementation of the present subject matter, the network establishment service 108 may start this process with a request to the monitoring device 102 to retrieve the MID corresponding to the monitoring device 102 and associated with a monitoring platform, like a sensing platform. Alternatively, in another example implementation, the monitoring device 102 may initiate the exchange of the MID with the network establishment service 108. In any event, the network establishment service 108, upon receiving the MID, may identify a preferred gateway node or a first gateway node 104A from amongst multiple gateway nodes 104 within the networked environment 100, and logically pairs the monitoring device 102 with the first gateway node 102, as shown in operation 204. In some example implementations, logically pairing the monitoring node 102 may include storing by a server 110 in the database 112, association information, such as a table or indexed information, identifying the MID and an identifier, like an IP address or MAC address of the first gateway node 104A. This association information may, in some embodiments, further identify locations of the monitoring device 102 corresponding to the MID and of the first gateway node 104A.

Upon logical pairing, the network establishment service 108 transmits the pairing indication or association information to the first gateway node 102, as shown in operation 206. For instance, the network establishment service 108, in some example implementations, may transmit a payload representing mapping of an identifier such as a RFID tag identifier associated with the MID and an IP address or physical address of the first gateway node 104A. The first gateway node 104A, upon receiving the association information, generates secured messages that are encrypted using the MID and can perform encrypted message transmissions with the monitoring device 102, as shown in operation 208.

In accordance with an example implementation of the present subject matter, the first gateway node may periodically or in any non-periodic or sequential fashion, update the network establishment service 108 about a connection status, such as transient or paired state, associated with preferred gateway node 104A or 104B, as well as with a location of monitoring device 102 and, in some embodiments, of the first and second gateway nodes 104A and 104B. For instance, in an example implementation, upon transmitting secured encrypted message 208 to the monitoring device 102, the first gateway node 104A may transmit a connection status message to the network establishment service 108, such that when the first gateway node 104A has not received any transmission back from the monitoring device 102, the connection status message would identify a status of the monitoring device 102 as transient. Alternatively, when the first gateway node 104A receives a transmission back from the monitoring device 102, the connection status message would identify a status of the monitoring device 102 as paired. Thus, the network establishment service 108, in accordance with various example implementations of the present subject matter, is constantly updated about a current connection status and location monitoring device 102 and of the preferred gateway node in real-time.

As mentioned earlier, the monitoring devices 102 may change their location or position within the networked environment 100. In such situations either the monitoring device 102 may lose communication with the first gateway node 104A or the first gateway node 104A may not be an ideal preferred gateway node for transmitting the data to the network establishment service 108. To address this change in circumstance, the network establishment service 108 can initiate a change in pairing of the monitoring device 102, as shown in operation 210. Accordingly, the network establishment service 108 provides an indication to the first gateway node of the pairing change in operation 212, which may comprise a changed-pairing message, and based thereon, in operation 214 the first gateway node 102 instructs the monitoring node 102 to enter into a discovery mode. In accordance with various example implementations of the illustrated exemplary embodiment, the network establishment service 108 may initiate a change in pairing based on receiving of an indication that the monitoring node 102 has reached the hand-off point. Accordingly, the network establishment service 108 identifies a new preferred gateway node from a set of gateway nodes, which in this example comprises second gateway node 104B, and transmits a pairing indication to the second gateway node 104B at operation 216, where the MID of the monitoring device 102 is associated with a unique identifier of, such as a physical address or an IP address of the second gateway node 104B. Upon receiving of the pairing indication or new association information, the second gateway node 104B or the new preferred gateway node is then able to generate secure messages and sends encrypted transmissions to the monitoring device 102, as shown in operation 218.

Accordingly, by securing data transmissions between each monitoring device 102 and the network establishment service 108, example embodiments described herein harden the network environment 100 against malicious access or tampering. Having described example embodiments at a high level, the design of the various devices performing various example operations is provided below.

System Architecture

Methods, apparatuses, and computer program products of the present invention may be embodied by any of a variety of devices. Example embodiments may include a plurality of devices operating in a globally-networked system. In doing so, example embodiments may comprise a network establishment service in connection with any of a variety of monitoring nodes.

Figure 3:
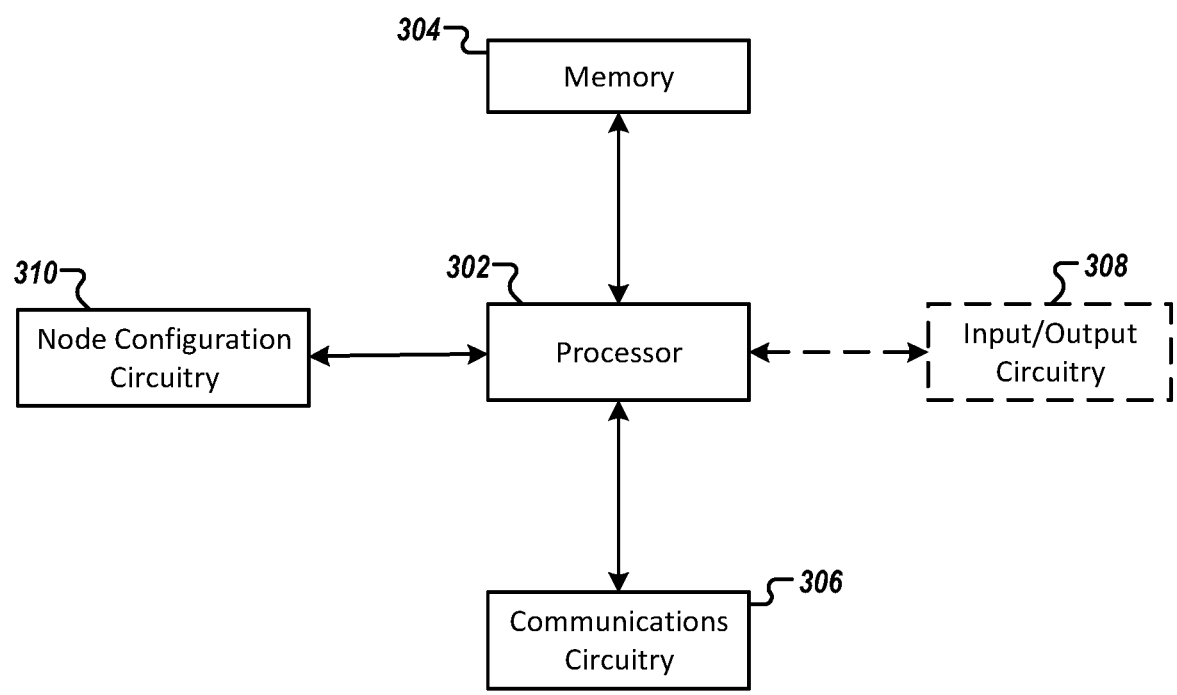
FIG. 3 illustrates a schematic block diagram of example circuitry embodying a network establishment service that may perform operations in accordance with some example embodiments described herein.

Turning to FIG. 3, an example apparatus 300 is illustrated that may represent a basic set of components of a device embodying an example network establishment service 108 or, in some embodiments, a server device 110 within a network establishment service 108. The apparatus 300 may include a processor 302, a memory 304, and communications circuitry 306. In some embodiments, the device may further include input/output circuitry 308 for interacting with a user, and node configuration circuitry 310 for pairing gateway nodes with monitoring nodes to facilitate creation of secure channels of communication between the monitoring nodes and the network establishment service 108. The apparatus 300 may be configured to execute the operations described below in connection with FIG. 6. Although these components 302-310 are described with some functional descriptors, it should be understood that the particular implementations necessarily include the use of particular hardware. It should also be understood that certain of these components 302-310 may include similar or common hardware. For example, the node configuration circuitry 310 may leverage use of the processor 302, memory 304, communications circuitry 306, and/or input/output circuitry 308 to perform their associated functions, and duplicate hardware is not required for the distinct components of the apparatus 300 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 300.

In some embodiments, the processor 302 (and/or co-processor or any other processing circuitry assisting or otherwise associated with the processor) may be in communication with the memory 304 via a bus for passing information among components of the apparatus. The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments contemplated herein.

The communications circuitry 306 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 306 may include, for example, a network interface for enabling communications with a wired or wireless communication network. For example, the communications circuitry 306 may include one or more network interface cards, antennae, buses, switches, routers, modems, and supporting hardware and/or software, or any other device suitable for enabling communications via a network. Additionally or alternatively, the communication interface 306 may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In some embodiments, the apparatus 300 may include input/output circuitry 308 that may, in turn, be in communication with processor 302 to provide output to a user and, in some embodiments, to receive an indication of user input. The input/output circuitry 308 may comprise a user interface and may include a display that may include a web user interface, a mobile application, a client device, or the like. In some embodiments, the input/output circuitry 308 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

In addition, the apparatus 300 also comprises node configuration circuitry 310, which includes hardware components designed to manage pairing of gateway nodes with monitoring nodes to facilitate creation of secure channels of communication between the monitoring nodes and the network establishment service 108. Node configuration circuitry 310 may utilize processor 302, memory 304, or other hardware component included in the apparatus 300 to perform these functions. Node configuration circuitry 310 may further utilize communications circuitry 106 to receive data from a variety of data sources.

It should be appreciated that, in some embodiments, node configuration circuitry 310 may include a separate processor, specially configured field programmable gate array (FPGA), or application specific interface circuit (ASIC) to perform the above-described functions. Node configuration circuitry 310 is therefore implemented using hardware components of the apparatus configured by either hardware or software for implementing these planned functions.

Figure 4:
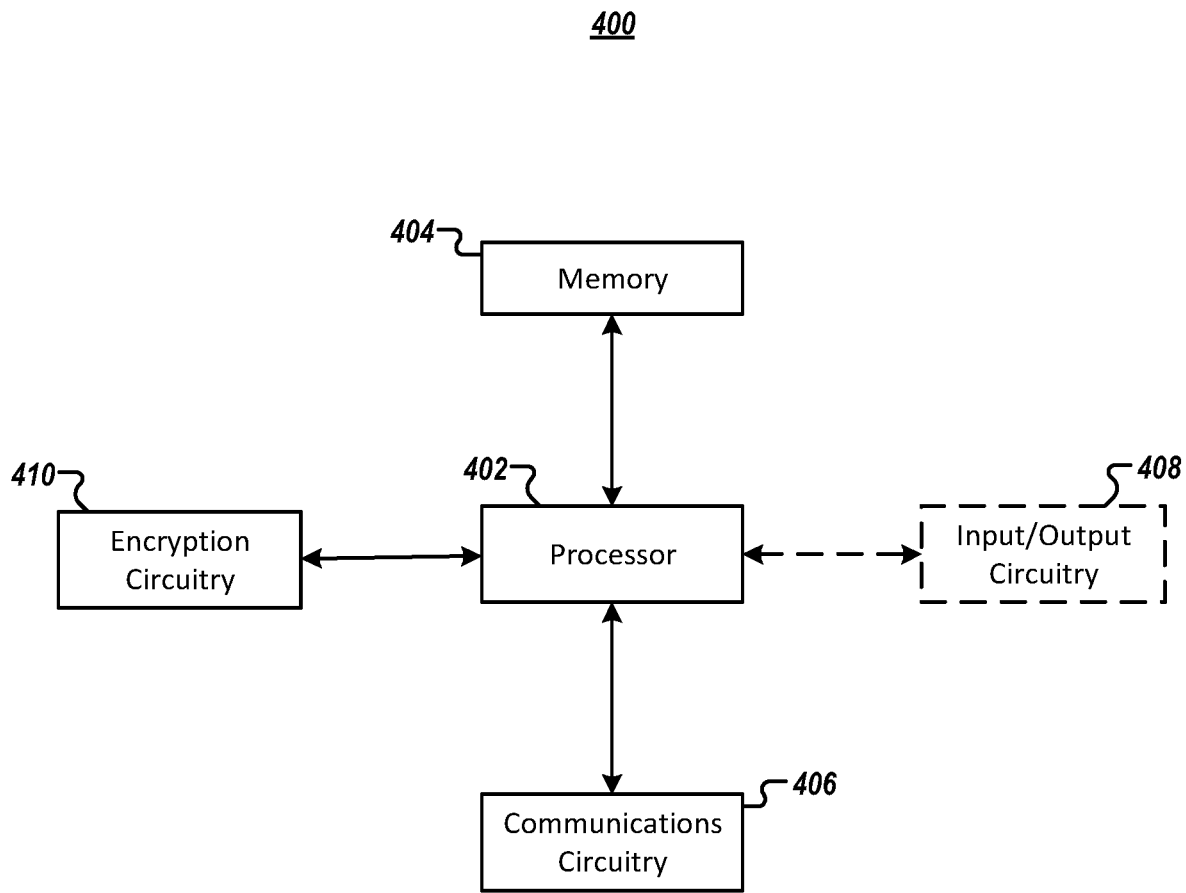
FIG. 4 illustrates a schematic block diagram of example circuitry embodying a gateway node that may perform operations in accordance with some example embodiments described herein.

Turning next to FIG. 4, an example apparatus 400 is illustrated that may represent a basic set of components of a device embodying a gateway node, such as nodes 104A or 104B shown in FIG. 1. The apparatus 400 may include a processor 402, a memory 404, communications circuitry 406, and, in some embodiments, input/output circuitry 408. In addition, the apparatus 400 may further include encryption circuitry 410 that can generate encrypted transmissions for communication with a monitoring node. The apparatus 400 may be configured to execute the operations described below in connection with FIG. 7. Although these components 402-410 are described with some functional descriptors, it should be understood that the particular implementations necessarily include the use of particular hardware. It should also be understood that certain of these components 402-410 may include similar or common hardware. For example, encryption circuitry 410 may leverage use of the processor 402, memory 404, communications circuitry 406, and/or input/output circuitry 408 to perform its associated functions, and duplicate hardware is not required for the distinct components of the apparatus 400 (although embodiments using duplicated hardware are also contemplated herein). As with use of the term "circuitry" in connection with the apparatus 300 above, the term "circuitry," when used herein with respect to components of the apparatus 400, includes particular hardware configured to perform the functions associated with the particular circuitry described herein, and while the term "circuitry" should be understood broadly to include hardware, in some embodiments, circuitry may also include software for configuring the hardware components of the apparatus 400.

Because the functionality of processor 402, a memory 404, communications circuitry 406, and input/output circuitry 408 are similar to the functionality described in connection with the similar features of FIG. 3, further description of such functionality is omitted here for brevity only.

However, the encryption circuitry 410 provides additional functionality not described previously in connection with FIG. 3. Specifically, encryption circuitry 410 may utilize any hardware component included in the apparatus 400 to perform its various functions. For instance, encryption circuitry 410 may utilize communications circuitry 406 to receive the MID of a particular monitoring node, thus facilitating generation of a secure message for transmission to that monitoring node.

Encryption circuitry 410 may utilize processing circuitry, such as the processor 402, to facilitate performance of its various operations, and may utilize memory 404 to store computer instructions that, when executed, cause the encryption circuitry 410 to perform those operations. It should be appreciated that, in some embodiments, encryption circuitry 410 may include a separate processor, specially configured field programmable gate array (FPGA), or application specific interface circuit (ASIC) to perform the above-described functions. Encryption circuitry 410 is therefore implemented using hardware components of the apparatus configured by either hardware or software for implementing these planned functions.

Figure 5:
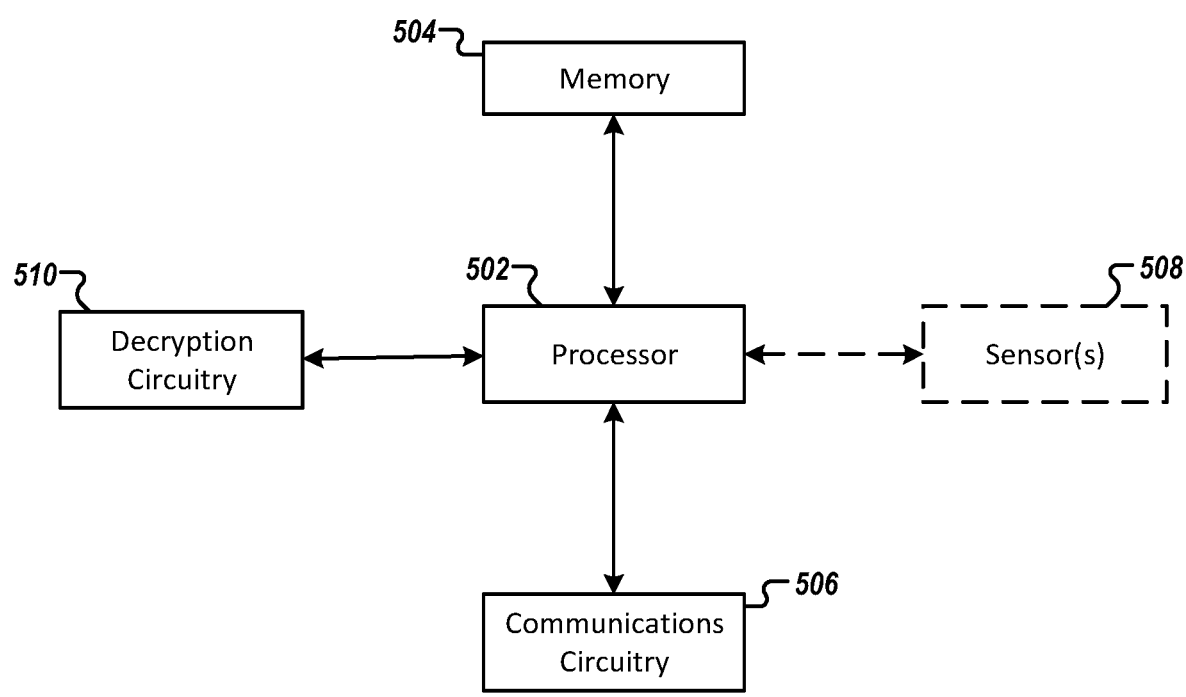
FIG. 5 illustrates a schematic block diagram of example circuitry embodying a monitoring node that may perform operations in accordance with some example embodiments described herein.

Turning next to FIG. 5, an example apparatus 500 is illustrated that may represent a basic set of components of a device embodying a monitoring node or a monitoring device, such as node 102 shown in FIG. 1. The apparatus 500 may include a processor 502, a memory 504, communications circuitry 506, and, in some embodiments, sensor(s) 508. In addition, the apparatus 500 may further include decryption circuitry 510 that can decipher encrypted transmissions received from a gateway node. The apparatus 500 may be configured to execute the operations described below in connection with FIG. 8. Although these components 502-510 are described with some functional descriptors, it should be understood that the particular implementations necessarily include the use of particular hardware. It should also be understood that certain of these components 502-510 may include similar or common hardware. For example, decryption circuitry 510 may leverage use of the processor 502, memory 504, or communications circuitry 506, to perform its associated functions, and duplicate hardware is not required for the distinct components of the apparatus 500 (although embodiments using duplicated hardware are also contemplated herein). As with use of the term "circuitry" in connection with the apparatus 300 above, the term "circuitry," when used herein with respect to components of the apparatus 500, includes particular hardware configured to perform the functions associated with the particular circuitry described herein, and while the term "circuitry" should be understood broadly to include hardware, in some embodiments, circuitry may also include software for configuring the hardware components of the apparatus 500.

Because the functionality of processor 502, a memory 504, and communications circuitry 506, are similar to the functionality described in connection with the similar features of FIG. 3, further description of such functionality is omitted here for brevity only.

However, the apparatus 500 may in some embodiments also include one or more sensor(s) 508. In this regard, sensor(s) 508 may comprise active or passive sensors that can gather information regarding the environment surrounding the apparatus 500 (e.g., by measuring temperature, pressure, speed, direction, acceleration, orientation, or the like).

Similarly, the decryption circuitry 510 also provides additional functionality not described previously in connection with FIG. 3. Specifically, decryption circuitry 510 may utilize any hardware component included in the apparatus 500 to perform its various functions. For instance, decryption circuitry 510 may utilize communications circuitry 506 to receive messages from a gateway node, thus facilitating deciphering of the encrypted transmission.

Decryption circuitry 510 may utilize processing circuitry, such as the processor 502, to facilitate performance of its various operations, and may utilize memory 504 to store computer instructions that, when executed, cause the decryption circuitry 510 to perform those operations. It should be appreciated that, in some embodiments, decryption circuitry 510 may include a separate processor, specially configured field programmable gate array (FPGA), or application specific interface circuit (ASIC) to perform the above-described functions. Decryption circuitry 510 is therefore implemented using hardware components of the apparatus configured by either hardware or software for implementing these planned functions.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or combination of hardware with software. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatuses 300, 400, and 500 as described in FIGS. 3, 4, and 5, respectively, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of example devices (e.g., apparatuses 300, 400, and 500) that may carry out some functionality of the system described herein, example embodiments of the present invention are described below in connection with a series of flowcharts.

Operations Performed by a Network Establishment Service

Figure 6:
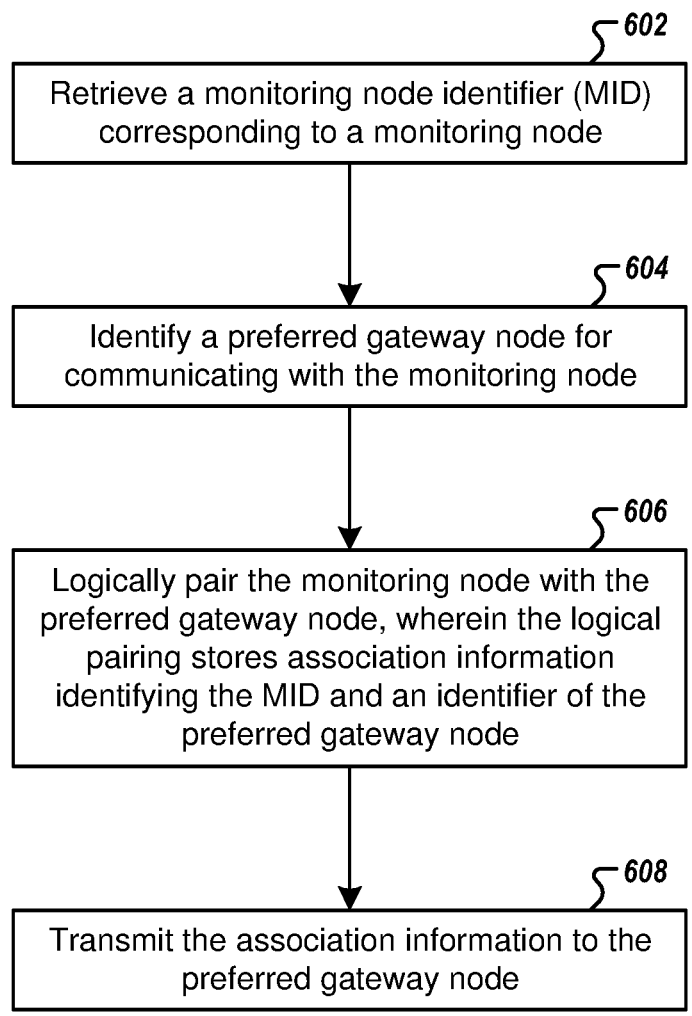
FIG. 6 illustrates a flowchart describing example operations performed by a network establishment service, in accordance with some example embodiments described herein.

Turning to FIG. 6, a flowchart is illustrated that contain operations performed by a network establishment service 108 to establish a secure communication channel with a monitoring node 102 via a particular gateway node 104. It will be understood that the operations outlined in FIG. 6 may be performed at a time of initial deployment of the monitoring node 102, or at a time when communication with the monitoring node 102 is handed off from a first gateway node 104 (e.g., gateway node 104A in FIG. 1) to a second gateway node (e.g., gateway node 104B in FIG. 1).

The operations illustrated in FIG. 6 may, for example, be performed by, with the assistance of, and/or under the control of an apparatus 300 embodying a network establishment service 108, which in turn may be a component of server system (e.g., server system 106), and more particularly through the use of one or more of processor 302, memory 304, communications circuitry 306, input/output circuitry 308, and node configuration circuitry 310.

Turning first to operation 602, the apparatus 300 includes means, such as processor 302 or the like, for retrieving a monitoring node identifier (MID) corresponding to a monitoring node or monitoring device 102 associated with a particular monitoring platform. The MID can comprise a private token, such as, for instance, coded information that uniquely identifies the monitoring node 102. In some embodiments, the processor 302 retrieves the MID in response to receiving a command or instruction via communications circuitry 306 or input/output circuitry 308. For instance, the network establishment service 108 may be a web service or a web server, where an administrator of the network establishment service 108 provides on a user-interface associated with the web service, a command to utilize multiple monitoring devices 102 deployed in a monitoring platform within the networked environment 100. The command is conveyed to apparatus 300 either via communications circuitry 306 (e.g., when the network administrator interacts with a different device from the apparatus 300 itself, and as such the command is transmitted from the network administrator's device to the apparatus 300) or via user interface 308 (e.g., when the network administrator interacts directly with the apparatus 300).

Upon receiving the command, the processor 302 of the network establishment service 108 can send a request to the one or more monitoring devices 102 for providing data along with the MIDs associated with the monitoring devices 102. This initial request may be transmitted via any suitable mode of communication. For instance, in situations where the monitoring devices 102 are physically connected to the network establishment service 108, the network establishment service 108 may send the request using any conventionally known application layer network protocols for receiving data files or the MIDs from the monitoring devices 102. For instance, in one example implementation, the network establishment service may retrieve the data by sending HTTP or FTP based requests to the monitoring devices 102 and receiving back HTTP or FTP responses from the monitoring devices 102. As another example, in situations where the monitoring devices 102 are not physically connected to the network establishment service 108, the network establishment service 108 may utilize an appropriate physical layer service to retrieve the data files or the MIDs from the monitoring devices 102.

As mentioned earlier, each MID is associated with a particular monitoring device 102 and can be stored as a coded information, for instance, as an RFID tag or as RFID encoded information, a linear barcode, a matrix code, or any other coded information indicia on the monitoring device 102. In this regard, retrieving the MID may include receiving the MIDs in encoded form, deciphering the encoded information, and thereby storing the deciphered coded information in the memory 304 of the network establishment service 108.

Turning next to operation 604, the apparatus 300 includes means, such as a node configuration circuitry 310 or the like, which, upon retrieving of the monitoring node identifier (MID) at the network establishment service 108, identifies a preferred gateway node 104 for communicating with the monitoring node 102. In this regard, the node configuration circuitry 310 identifies the preferred gateway node, such as a first gateway node 104 from amongst a set of gateway nodes and based on information regarding the monitoring node 102. For instance, in one example implementation, the node configuration circuitry 310 may access information stored by a memory (e.g., database 112 of the network establishment service 108) identifying current location information of the monitoring device 102. It will be appreciated that this memory may comprise memory 304 in some embodiments, and in others may be a remote storage device, in which case the current location information may be retrieved via the communications circuitry 306. Accordingly, the node configuration circuitry 310 may access the location information associated with the monitoring device 102 and, based on the location information, selects the preferred gateway node 104 for communicating with the monitoring device 102. In this regard, the preferred gateway node 104 for a given monitoring device 102 may be selected based on the relative locations of the monitoring device 102 and the set of gateway nodes 104 that may be usable to communicate with the monitoring device 102.

In some example embodiments, the network establishment service 102 may predefine geo-fences associated with a given gateway node 104, which may be stored by the network establishment service 102 (e.g., in database 112 or the like). When the location of the monitoring device 102 falls within the geo-fence associated with a particular gateway node 104, that gateway node 104 is selected as the preferred gateway node. When a logical pairing between the monitoring device 102 and a particular gateway node 104A exists but the location of the monitoring device 102 falls within a geo-fence associated with a different gateway node 104B, this fact comprises an indication to the network establishment service that the monitoring node has reached a handoff point. In such circumstances, the apparatus 300 may include means, such as node configuration circuitry or the like, for identifying the new preferred gateway node for the monitoring device from the set of gateway nodes.

Turning next to operation 606, the apparatus 300 includes means, such as node configuration circuitry 310, for logically pairing the monitoring device 102 with the preferred gateway node 104. In this regard, the paired information can be stored, by the node configuration circuitry 310, in the memory 304 or otherwise in a database 112 of the network establishment service 108 (although these may be the same component in some embodiments). The paired information can be an association information such as, for instance, an indexed table or mapping identifying the MID associated with the monitoring device 102 and an identifier associated with the preferred gateway node 104. For instance, in one example implementation, the node configuration circuitry 310 logically pairs a coded information (MID), such as a barcode or a serial number, associated with the monitoring device 102 with a physical or network address of the gateway node 104A or 104B. In such example implementation, the paired information comprising the MID and the identifier (e.g., an IP or MAC address) corresponding to the preferred gateway node 104A or 104B is stored in the memory 304 of the network establishment service 108.

The node configuration circuitry 310 is further configured to handle situations where the logical pairing overrides a prior logical pairing between the monitoring device 102 and a different gateway node 104 that was previously identified as the preferred gateway node. In such scenarios, the node configuration circuitry 310 may cause transmission, by the communications circuitry 306, of a changed-pairing message to the previously preferred gateway node indicating a change in logical pairing of the monitoring node.

Turning next to operation 608, the apparatus 300 includes means, such as communication circuitry 306 or the like, for transmitting the association information to the preferred gateway node 104. In one example implementation, the transmission of the association information by the network establishment service 108, may occur in real-time as triggered by a newly created logical pairing or a change or an update in the association information corresponding to the preferred gateway node and/or the monitoring devices 102. Alternatively, in another example implementation, the transmission of the association information by the network establishment service 108 may occur at a later time based on a determined status of the monitoring device 102 and/or the preferred gateway node 104 received at the communication circuitry 306 of the network establishment service 108. In this regard, the communication circuitry may further be configured to receive a connection status message from a preferred gateway node, for instance the first gateway node 104A, where the connection status message identifies a status of the monitoring device 102 as either transient or paired, depending upon whether the preferred gateway node 104A has received any transmissions from the monitoring device 102 after transmission of the association information to the preferred gateway node 104A.

Transmission of the association information to the preferred gateway node facilitates secure connection establishment between the preferred gateway node 104A and the monitoring node 102, which, according to the illustrated exemplary embodiment involves generating secured messages that are encrypted using the MID used in operation 606 to logically pair the monitoring node 102 with the preferred gateway node. In some example implementations, the association information transmitted to the preferred gateway node 104A facilitates generation of secured messages by computing hash values of the MID and using the hashed values in a message structure used for communication between the preferred gateway node 104A and the monitoring device 102. For instance, the computed hashed value may be appended as a header to a payload of the message that is being sent from the preferred gateway node 104A to the monitoring device 102. Accordingly, the secured messages communicated from the preferred gateway node 104A to the monitoring node 102 ensures security of the communication channel between the monitoring node 102 and the network establishment service 108.

Having described example operations performed by a network establishment service 108, operations performed by a gateway node 104 are described below in connection with FIG. 7, and operations performed by a monitoring device 102 are described below in connection with FIG. 8.

Operations Performed by a Gateway Node

Figure 7:
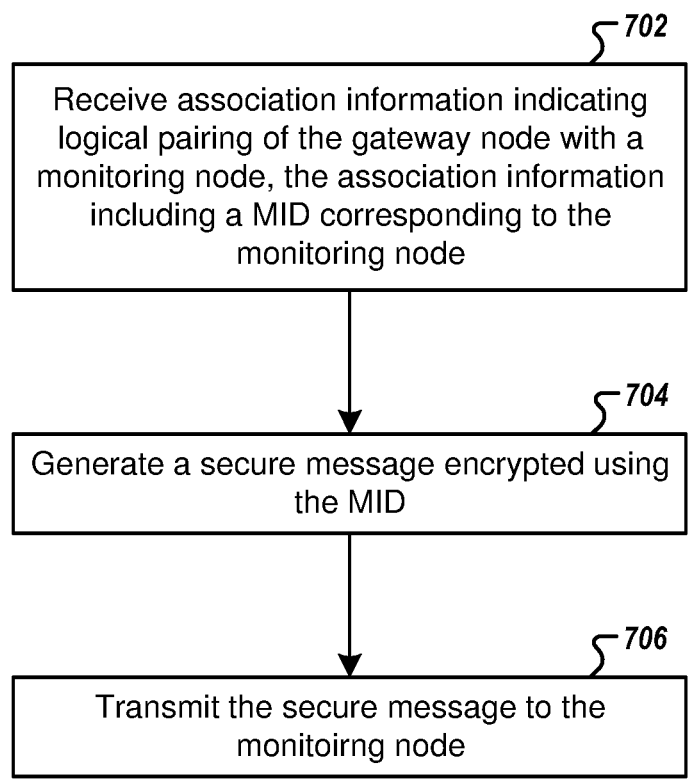
FIG. 7 illustrates a flowchart describing example operations performed by a gateway node, in accordance with some example embodiments described herein.

Turning to FIG. 7, a flowchart is illustrated that contain operations performed by a gateway node to facilitate establishment of a secure communication channel between a network establishment service and a monitoring node. The operations illustrated in FIG. 7 may, for example, be performed by, with the assistance of, and/or under the control of an apparatus 400 embodying a gateway node 104, and more particularly through the use of one or more of processor 402, memory 404, communications circuitry 406, and encryption circuitry 410.

Turning first to operation 702, the apparatus 400 includes means, such as communications circuitry 406 or the like, for receiving an association information from the network establishment service 108. In regard to this, the association information can be indicative of logical pairing of the gateway node 104 with a given monitoring device 102. Further, the association information, in one example implementation of the illustrated embodiment, can include a MID associated with the monitoring device 102, such as any of a coded information representative of a linear barcode, a matrix barcode, RFID encoded information, and/or like. In some example implementations, the communications circuitry 406 receives the association information from the network establishment service 108 based on occurrence of various types of events. For example, in one such implementation, the communications circuitry 406 receives the association information after the network establishment service 108 performs an initial logical pairing when the monitoring device 102 is initially deployed within the networked environment as described earlier. Alternatively, in another implementation, the communications circuitry 406 receives the association information based on a change or update in the association information by the network establishment service 108. In this latter situation, the communication circuitry 406 receives the association information in the form of a changed-paring message indicating a change in the logical pairing of the monitoring device 102.

Turning next to operation 704, the apparatus 400 includes means, such as encryption circuitry 410 or the like, for, upon receiving of the association information, generating a secure message. The secure message may comprise a message or a data packet, such as an Internet protocol (IP) data packet, which upon creation is encrypted by the encryption circuitry 410 using the MID of the monitoring device 102. In regard to this, the encryption circuitry 410 generates the secure message by computing a hash value of the MID and embedding the hash value in a structure of the message. For instance, the encryption circuitry 401 may use a cryptographic hash function for computing the hash value of the MID. Accordingly, in an example implementation, upon computing the hash value, the encryption circuitry 410 may append the computed hash value in a header of the structure of the message that is be generated. Typically, computing the hash values for data corresponding to the MID involves mapping variable size data corresponding to the MID to a fixed size hash using the cryptographic hash function. Thereafter, the computed hashed value may be appended or concatenated anywhere (for instance, at the header or footer, or before or after the data payload) within the structure of the message. As it can be understood, the message or data packet generated may follow various structures, such as IPv4 or IPv6 IP packet structure, depending upon the network protocol used for communication in the networked environment. Also, in accordance with a known property of hash functions, all of the computed hash values are unique for different MIDs corresponding to multiple monitoring nodes 102 in the networked environment 100.

Turning next to operation 706, apparatus 400 includes means, such as communications circuitry 406, for transmitting the secure message to the monitoring device 102. In some example implementations, the communication circuitry 406, upon transmitting the secure message, may receive an acknowledgement or other message from the monitoring device 102 in response to the transmitted secure message. Additionally or alternatively, after transmission of the secure message the communication circuitry 406 may transmit a connection status message to the network establishment service 108, where the connection status message identifies a status of the monitoring device 102. For example, in one instance, the connection status message identifies the status of the monitoring device 102 as transient in situations in which the apparatus 400 has not received a transmission from the monitoring device 102 in response to transmission of the secured message from the monitoring device 102. Alternatively, when the apparatus 400 receives a transmission from the monitoring device 102 in response to transmission of the secured message, the connection status message may identify the status of the monitoring device 102 as paired, indicating that a secure communication channel has been established with the monitoring device 102.

In addition to the functionality described in the procedure illustrated in FIG. 7, the communication circuitry 406 may also receive from the network establishment service 108 a changed-pairing message that indicates a change in the logical pairing of the monitoring device 102 away from the gateway node 104 represented by the apparatus 400. The change in the logical pairing, in some situations, may happen when the monitoring device 102 performs a hand-off in the networked environment. Alternatively, the change in the logical pairing may happen when the monitoring device 102 is identified as transient as a result of a failure of the gateway node 104 to receive a responsive communication following initial pairing. In such circumstances, upon receiving the changed-pairing message, the communications circuitry 406 may be further configured to transmit a secure message to the monitoring device 102 indicating a change in mode of the monitoring device 102 to a discovery mode. Typically, in the discovery mode, the monitoring device 102 searches for another gateway node 104A or 104B for pairing. Further, in such situations, the monitoring device 102 may transmit a message to the network establishment service 108 indicating that the monitoring device 102 has reached a hand-off point. Accordingly, the network establishment service 108 may identify a new preferred gateway node 104 from a set of gateway nodes and change the logical pairing information of the monitoring device 102 to the new preferred gateway node 104. Thereafter, the communication circuitry 406 receives the changed-pairing message from the network establishment service 108.

Having described example operations performed by a gateway node 104, operations performed by a monitoring device 102 will now be described in connection with FIG. 8.

Operations Performed by a Monitoring Node

Figure 8:
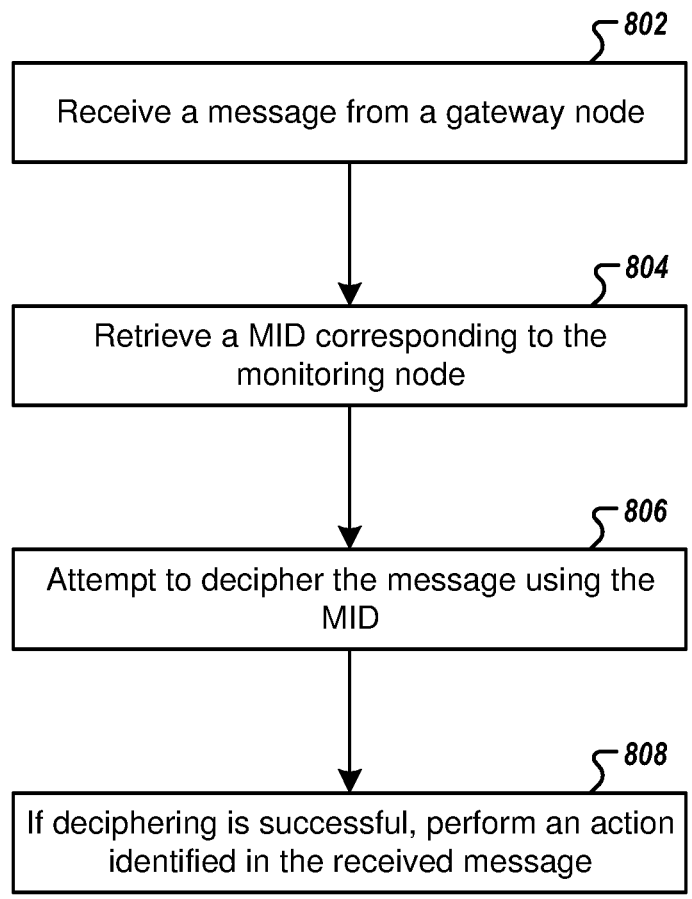
FIG. 8 illustrates a flowchart describing example operations performed by a monitoring node, in accordance with some example embodiments described herein.

Turning to FIG. 8, a flowchart is illustrated that contain operations performed by a monitoring node to securely communicate with a network establishment service. The operations illustrated in FIG. 8 may, for example, be performed by, with the assistance of, and/or under the control of an apparatus 500 embodying a monitoring node (e.g., monitoring node 102), and more particularly through the use of one or more of processor 502, memory 504, communications circuitry 506, sensor(s) 508, or decryption circuitry 510.

Turning first to operation 802, the apparatus 500 includes means, such as communications circuitry 506 or the like, for receiving a message from the gateway node 104A. For example, the message may be a secured message generated by the gateway node 104, and may thus include a hash value of the MID corresponding to the monitoring device 102, as described earlier with reference to FIG. 7.

Turning next to operation 804, the apparatus 500 representing the monitoring device 102 retrieves a MID stored in the memory 504. In this regard, each of the multiple monitoring devices 102 in a networked environment 100 is associated with corresponding MID comprising a unique token which identifies the particular monitoring device 102 uniquely within the networked environment. These MIDs facilitate targeted use of the mobile devices in a mobile platform. For instance, in one example implementation, various commodities in a logistics environment may be associated with RFID tags storing encoded information corresponding to details of the commodities, such as, item ID, item type, manufacturer details, expiry date, or the like. In such an implementation, the RFID tags would be the monitoring devices 102 for such commodities, and would include unique MIDs facilitating communication with specific RFID tags to monitor specific aspects of the commodities. In another example implementation, the monitoring devices 102 may be various sensor nodes or sensor chips, such as humidity sensors, pressure sensor, or temperature sensors where the corresponding MIDs can be physical addresses or a hardware serial number of such sensor chips. Alternatively, the MIDs may be any other coded information or data that includes a unique token for identifying the monitoring devices 102 as described earlier. Accordingly, in such example implementations, the memory 504 of the monitoring device 102 can store the MID associated with that monitoring device 102 and upon the receiving of the message at the monitoring device 102 retrieves the stored MID for message validation purposes.

Turning to next operation 806, the apparatus 500 includes means, such as decryption circuitry 510 or the like, for deciphering the received message using the MID retrieved from the memory 504. In this regard, deciphering the received message may involve parsing and decoding the received message. For instance, the decryption circuitry 510 may extract a first hash value that is present within the structure (e.g., the header) of the received message. Further, the decryption circuitry 510 may compute a second hash value using the MID retrieved from the memory 504 as described in the previous operation. The decryption circuitry 510 can thereafter perform a validation process that compares the first hash value against the second hash value to decipher the received message. In some example implementations, deciphering the received message may only include steps of parsing and decoding the received message and accessing the hash value from the decoded message. In such example implementations, the deciphering circuitry 510 may separately perform a validation process for comparing the hash value extracted from the received message with another hash value computed using the MID stored in the memory 504 of the monitoring device 102. Alternatively, in other example implementations, the deciphering circuitry 510 may perform the parsing, decoding, and validation of the message as a single process step.

In accordance with various example implementations of the present subject matter, if the first hash value matches with the second hash value, it can be understood, that (a) the network establishment service 108 has correctly performed the logical pairing of the monitoring device 102 with a gateway node 104 and (b) the monitoring device 102 is correctly paired to the preferred gateway node 104. However, if the first hash value doesn't match the second hash value, it can be understood, that either (a) the network establishment service 108 has incorrectly performed the logical pairing of the monitoring device 102 with a gateway node 104, (b) the monitoring device 102 is incorrectly paired to the preferred gateway node 104, or (c) that a malicious message has been received attempting to acquire unauthorized information from the monitoring device 102. This may happen, in situations, when any of the monitoring devices 102, gateway nodes 104, or the network establishment service 108 in the networked environment 100 has been compromised due to any of the network attacks described earlier.

Turning to the next operation 808, for the instance in which the decryption circuitry 510 is successful in deciphering the message, the processor 502 performs an action identified in the received message. In this regard, the action identified in the message may be performed if the hash value accessed from the message matches the hash value computed for the MID stored in the memory of the monitoring device 102. The action may comprise any of a number of various actions. In accordance with various example implementations, the action identified in the message received by the communication circuitry 506 may comprise, transmitting an acknowledgement message back from the communication circuitry 506 to the gateway node 104. Additionally or alternatively, the action may comprise, transmitting data gathered by the monitoring device 102 to the gateway node 104. In some embodiments, the action may include storing the information contained in the received message on the memory 504 of the monitoring device 102 and/or changing a mode of operation of the monitoring node 102. For instance, in some example implementations, the action may comprise changing the mode of operation of the monitoring device 102, such as from a high power consumption mode to low-power consumption mode, or from a transient mode to a data gathering mode, or from a static mode to the discovery mode, as described earlier.

As described above, by securing data transmissions between each monitoring device 102 and the network establishment service 108, example embodiments described herein harden the network environment 100 against malicious access or tampering.

FIGS. 6, 7, and 8 illustrate example flowcharts describing operations performed in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions residing on a non-transitory computer-readable storage memory. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. When executed, the instructions stored in the computer-readable storage memory produce an article of manufacture configured to implement the various functions specified in flowchart blocks. Moreover, execution of a computer other processing circuitry to perform various functions converts the computer or other processing circuitry into a particular machine configured to perform an example embodiment of the present invention. Accordingly, the operations set forth in the flowcharts define one or more algorithms for configuring a computer or processor, to perform an example embodiment. In some cases, a general purpose computer may be provided with an instance of the processor which performs algorithms described in one or more flowcharts to transform the general purpose computer into a particular machine configured to perform an example embodiment.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method for establishing a secure communication channel between a network establishment service and a monitoring node, the method comprising:
   retrieving, by a processor associated with the network establishment service, a monitoring node identifier (MID) corresponding to the monitoring node associated with a monitoring platform, wherein the MID comprises a private token unique to the monitoring node;
   identifying, by the processor associated with the network establishment service and based on location information associated with the monitoring node, a preferred gateway node from a plurality of gateway nodes for communicating with the monitoring node;
   logically pairing, by the processor associated with the network establishment service, the monitoring node with the preferred gateway node, wherein logically pairing the monitoring node with the preferred gateway node includes storing, by a memory associated with the network establishment service, association information identifying the MID and an identifier of the preferred gateway node;
   transmitting, by the processor associated with the network establishment service, the association information to the preferred gateway node, wherein transmission of the association information causes the preferred gateway node to generate a secure message to the monitoring node, wherein the secure message is encrypted using the MID.

2. The method of claim 1, further comprising:
   receiving, by the processor associated with the network establishment service and after transmission of the association information to the preferred gateway node, a connection status message from the preferred gateway node,
   wherein in an instance in which the preferred gateway node has not received a transmission from the monitoring node, the connection status message identifies a status of the monitoring node as transient, and
   wherein in an instance in which the preferred gateway node has received a transmission from the monitoring node, the connection status message identifies a status of the monitoring node as paired.

3. The method of claim 1, wherein the monitoring node stores the MID as coded information, and wherein retrieving the MID comprises deciphering the coded information.

4. The method of claim 3, wherein the coded information is represented using a linear barcode, a matrix barcode, or radio frequency identification (RFID) encoded information.

5. The method of claim 1, wherein the association information facilitates generation of the secure messages by the preferred gateway node using a hash value computation of the MID.

6. The method of claim 1, wherein the preferred gateway node comprises a network router, a network switch, a proxy server, or a network bridge.

7. The method of claim 1, wherein the monitoring node comprises at least one of a sensor, a transmitter, or a receiver.

8. The method of claim 1, further comprising:
receiving, by the processor associated with the network establishment service, an indication that the monitoring node has reached a handoff point;
identifying, by the processor associated with the network establishment service and based on the handoff point, a new preferred gateway node for the monitoring node from a set of gateway nodes;
logically pairing, by the processor associated with the network establishment service, the monitoring node with the new preferred gateway node, wherein logically pairing the monitoring node with the new preferred gateway node includes storing, by the memory of the network establishment service, new association information including the MID and an identifier of the new preferred gateway node.

9. The method of claim 8, further comprising:
transmitting, by the processor associated with the network establishment service, a changed-pairing message to the preferred gateway node indicating a change in logical pairing of the monitoring node; and
transmitting, by the processor associated with the network establishment service, the new association information to the new preferred gateway node, wherein transmission of the new association information facilitates generation, by the new preferred gateway node, of secure messages to the monitoring node that are encrypted using the MID.

10. An apparatus for establishing a secure communication channel between a network establishment service and a monitoring node, the apparatus comprising:
a processor configured to retrieve a monitoring node identifier (MID) corresponding to the monitoring node associated with a monitoring platform, wherein the MID comprises a private token unique to the monitoring node;
node configuration circuitry configured to identify, based on location information associated with the monitoring node, a preferred gateway node from a plurality of gateway nodes for communicating with the monitoring node, and logically pair the monitoring node with the preferred gateway node, wherein logically pairing the monitoring node with the preferred gateway node includes storing, by a memory of the network establishment service, association information identifying the MID and an identifier of the preferred gateway node; and
communications circuitry configured to transmit the association information to the preferred gateway node, wherein transmission of the association information causes the preferred gateway node to generate secure messages to the monitoring node, wherein the secure messages are encrypted using the MID.

11. The apparatus of claim 10, further comprising:
wherein the communications circuitry is further configured to receive, after transmission of the association information to the preferred gateway node, a connection status message from the preferred gateway node, wherein in an instance in which the preferred gateway node has not received a transmission from the monitoring node, the connection status message identifies a status of the monitoring node as transient, and wherein in an instance in which the preferred gateway node has received a transmission from the monitoring node, the connection status message identifies a status of the monitoring node as paired.

12. The apparatus of claim 10, wherein the monitoring node is configured to store the MID as coded information, and wherein retrieving the MID comprises deciphering the coded information.

13. The apparatus of claim 12, wherein the coded information is represented using a linear barcode, a matrix barcode, or radio frequency identification (RFID) encoded information.

14. The apparatus of claim 10, wherein the association information facilitates generation of the secure messages by the preferred gateway node using a hash value computation of the MID.

15. The apparatus of claim 10, wherein the apparatus is configured to receive an indication that the monitoring node has reached a handoff point;
wherein the node configuration circuitry is further configured to identify, based on the handoff point, a new preferred gateway node for the monitoring node from a set of gateway nodes, and
logically pair the monitoring node with the new preferred gateway node, wherein logically pairing the monitoring node with the new preferred gateway node includes storing, by the memory of the network establishment service, new association information including the MID and an identifier of the new preferred gateway node.

16. The apparatus of claim 15, further comprising:
wherein the communications circuitry is further configured to transmit a changed-pairing message to the preferred gateway node indicating a change in logical pairing of the monitoring node, and transmit the new association information to the new preferred gateway node, wherein transmission of the new association information facilitates generation, by the new preferred gateway node, of secure messages to the monitoring node that are encrypted using the MID.

17. A computer program product for establishing a secure communication channel between a network establishment service and a monitoring node, the computer program product comprising at least one non-transitory computer-readable storage medium storing comprising program code instructions that, when executed, cause an apparatus to:
retrieve a monitoring node identifier (MID) corresponding to the monitoring node associated with a monitoring platform, wherein the MID comprises a private token unique to the monitoring node;
identify, based on location information regarding the monitoring node, a preferred gateway node from a plurality of gateway nodes for communicating with the monitoring node;
logically pair the monitoring node with the preferred gateway node, wherein logically pairing the monitoring node with the preferred gateway node includes storing, by a memory associated with the network establishment service, association information identifying the MID and an identifier of the preferred gateway node;
transmit the association information to the preferred gateway node, wherein transmission of the association information causes the preferred gateway node, to generate secure messages to the monitoring node, wherein the secure messages are encrypted using the MID.

18. The computer program product of claim 17, wherein the program code instructions, when executed, further cause the apparatus to:

receive, after transmission of the association information to the preferred gateway node, a connection status message from the preferred gateway node, wherein in an instance in which the preferred gateway node has not received a transmission from the monitoring node, the connection status message identifies a status of the monitoring node as transient, and wherein in an instance in which the preferred gateway node has received a transmission from the monitoring node, the connection status message identifies a status of the monitoring node as paired.

19. The computer program product of claim 17, wherein the program code instructions, when executed, cause the apparatus to:

receive an indication that the monitoring node has reached a handoff point; identify, by based on the handoff point, a new preferred gateway node for the monitoring node from a set of gateway nodes;

logically pair the monitoring node with the new preferred gateway node, wherein logically pairing the monitoring node with the new preferred gateway node includes storing, by the memory of the network establishment service, new association information including the MID and an identifier of the new preferred gateway node.

20. The computer program product of claim 19, wherein the program code instructions, when executed, cause the apparatus to:

transmit a changed-pairing message to the preferred gateway node indicating a change in logical pairing of the monitoring node; and transmit the new association information to the new preferred gateway node, wherein transmission of the new association information facilitates generation, by the new preferred gateway node, of secure messages to the monitoring node that are encrypted using the MID.

* * * * *